United States Patent
Venkatraman et al.

(10) Patent No.: US 9,253,599 B1
(45) Date of Patent: Feb. 2, 2016

(54) RTT PROCESSING BASED ON A CHARACTERISTIC OF ACCESS POINTS

(71) Applicant: QUALCOMM Incorporated, San Diego, CA (US)

(72) Inventors: Sai Pradeep Venkatraman, Santa Clara, CA (US); Vinay Sridhara, Sunnyvale, CA (US); Saumitra Mohan Das, Santa Clara, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/464,458

(22) Filed: Aug. 20, 2014

(51) Int. Cl.
*H04W 24/00* (2009.01)
*H04W 4/02* (2009.01)
*H04L 12/26* (2006.01)
*H04L 29/12* (2006.01)

(52) U.S. Cl.
CPC ........... *H04W 4/023* (2013.01); *H04L 43/0864* (2013.01); *H04L 61/6022* (2013.01); *H04W 4/025* (2013.01)

(58) Field of Classification Search
CPC .. H04W 4/023; H04W 4/025; H04L 43/0864; H04L 61/6022
USPC .......... 455/456.1, 456.2, 456.3, 456.4, 456.5, 455/456.6, 457, 404.2, 414.2
See application file for complete search history.

(56) References Cited

U.S. PATENT DOCUMENTS

| | | | |
|---|---|---|---|
| 5,912,644 A | 6/1999 | Wang | |
| 8,385,943 B1 | 2/2013 | Han et al. | |
| 8,478,298 B1 * | 7/2013 | Mansour | 455/456.1 |
| 8,504,059 B2 * | 8/2013 | Huang et al. | 455/456.1 |
| 8,565,783 B2 | 10/2013 | Yang et al. | |
| 2002/0155845 A1 * | 10/2002 | Martorana | 455/456 |
| 2010/0081451 A1 * | 4/2010 | Mueck et al. | 455/456.1 |
| 2010/0159949 A1 * | 6/2010 | Selgert et al. | 455/456.1 |
| 2010/0190509 A1 * | 7/2010 | Davis | 455/456.1 |
| 2011/0207456 A1 * | 8/2011 | Radulescu et al. | 455/434 |
| 2011/0269478 A1 * | 11/2011 | Das et al. | 455/456.1 |

(Continued)

FOREIGN PATENT DOCUMENTS

WO 2014089531 6/2014

OTHER PUBLICATIONS

International Search Report and Written Opinion—PCT/US2015/041191—ISA/EPO—Oct. 19, 2015.

*Primary Examiner* — Shahriar Behnamian
(74) *Attorney, Agent, or Firm* — Silicon Valley Patent Group LLP (57) ABSTRACT

Systems, apparatus and methods for estimating a location of a mobile device are presented. Before computing a location estimate, the mobile device groups a plurality of access points into two or more categories (for example, a first list of access points having a first characteristic and a second list of access points having a second characteristic). Round-trip time (RTT) measurements are computed for access points in the first list. A Short Interframe Space (SIFS) value may be determined for each access point in the first list or generally SIFT representing the first list as a whole. The RTT measurements are compensated with the appropriate SIFS value. The mobile device then computes its location or position fix estimate using the compensated RTT values while excluding less accurate RTT values from other access points. As a result, the location estimate eliminates adverse influent from some access points.

21 Claims, 5 Drawing Sheets

(56) References Cited

U.S. PATENT DOCUMENTS

| | | | |
|---|---|---|---|
| 2012/0122484 A1* | 5/2012 | Marchenko et al. | 455/456.1 |
| 2012/0157115 A1* | 6/2012 | Jeong | 455/456.1 |
| 2012/0258732 A1* | 10/2012 | Jeong | 455/456.1 |
| 2013/0109413 A1 | 5/2013 | Das et al. | |
| 2013/0184002 A1 | 7/2013 | Moshfeghi | |
| 2013/0196680 A1* | 8/2013 | Soliman et al. | 455/456.1 |
| 2014/0087751 A1* | 3/2014 | Do et al. | 455/456.1 |
| 2014/0120945 A1 | 5/2014 | Sharma et al. | |

\* cited by examiner

FIG. 1

| Standard | Band | SIFS |
|---|---|---|
| IEEE 802.11-1997 (FHSS) | 2.4 GHz | 28 μs |
| IEEE 802.11-1997 (DSSS) | 2.4 GHz | 10 μs |
| IEEE 802.11b | 2.4 GHz | 10 μs |
| IEEE 802.11g | 2.4 GHz | 10 μs |
| IEEE 802.11n | 2.4 GHz | 10 μs |
| IEEE 802.11a | 5 GHz | 16 μs |
| IEEE 802.11n | 5 GHz | 16 μs |
| IEEE 802.11ac | 5 GHz | 16 μs |

RTT PROCESSING BASED ON A CHARACTERISTIC OF ACCESS POINTS

CROSS-REFERENCE TO RELATED APPLICATIONS

This is the first application filed for the present technology.

BACKGROUND

I. Field of the Invention

This disclosure relates generally to systems, apparatus and methods for estimating a location of a mobile device, and more particularly to capturing and using only some RTT measurements while excluding other RTT measurements when computing a location estimate of the mobile device based on a feature of access points.

II. Background

In current high-precision indoor positioning, also known as precise indoor positioning (PIP), a mobile device measures round-trip time (RTT) between the mobile device and various assess points, estimates a turnaround calibration function (TCF) for each RTT measurement, computes a difference between each RTT measurement and the corresponding TCF, and then computes a position estimate of the mobile device based on the differences. A TCF for each access point introduces an uncertain value. A TCF includes the delays both within an access point (primarily due to short interframe space (SIFS)) and within the mobile device. For example, IEEE 802.11 systems may set a TCF based on the physical (PHY) layer and the operating frequency band of each access point.

It can be useful is a way to reduce a number of unknowns by grouping access points and generalizing a TCF value for a group before computing a location estimate based on a more accurate group while excluding less accurate groups of access points.

BRIEF SUMMARY

Disclosed are systems, apparatus and methods for estimating a location of a mobile device. Before computing a location estimate, the mobile device groups a plurality of access points into two or more categories (for example, a first list or set of access points belonging to a first category and a second list or set of access points belonging to a second category). Round-trip time (RTT) measurements are computed for assess points in the first list. A SIFS value may be determined for each access point in the first list or generally for the first list as a whole. Alternatively, a single TFC value may be set for access points in the first list. A TFC value may be computed from a SIFS value by adding expected delays in the mobile device. The RTT measurements are compensated with the appropriate SIFS or TCF value. The mobile device then computes its location estimate using the compensated RTT values while excluding access points in the second list with less accurate RTT values. As a result, the location estimate eliminates adverse influent from access points in the second list.

According to some aspects, disclosed is a method in a mobile device for estimating a location of the mobile device, the method comprising: receiving signals from a plurality of access points; forming a first list of access points from only some of the plurality of access points based on a characteristic; measuring round-trip times (RTTs) for access points in the first list; estimating a first turnaround calibration function (TCF) representing the first list of access points; and computing a position fix of the mobile device based on the RTTs for access points in the first list and the first TCF.

According to some aspects, disclosed is a mobile device for estimating a location of the mobile device, the mobile device comprising: a transceiver configured to receive signals from a plurality of access points; a processor coupled to the transceiver; and a memory coupled to the processor, the memory having stored thereon code configured to be executed by the processor, the code instructing the processor to: form a first list of access points from only some of the plurality of access points based on a characteristic; measure round-trip times (RTTs) for access points in the first list; estimate a first turnaround calibration function (TCF) representing the first list of access points; and compute a position fix of the mobile device based on the RTTs for access points in the first list and the first TCF.

According to some aspects, disclosed is a mobile device for estimating a location of the mobile device, the mobile device comprising: means for receiving signals from a plurality of access points; means for forming a first list of access points from only some of the plurality of access points based on a characteristic; means for measuring round-trip times (RTTs) for access points in the first list; means for estimating a first turnaround calibration function (TCF) representing the first list of access points; and means for computing a position fix of the mobile device based on the RTTs for access points in the first list and the first TCF.

According to some aspects, disclosed is a non-transient computer-readable storage medium including program code stored thereon, comprising program code for: receiving signals from a plurality of access points; forming a first list of access points from only some of the plurality of access points based on a characteristic; measuring round-trip times (RTTs) for access points in the first list; estimating a first turnaround calibration function (TCF) representing the first list of access points; and computing a position fix of the mobile device based on the RTTs for access points in the first list and the first TCF.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (for example, using different PN codes for each satellite as in GPS or using the same code on different frequencies as in GLONASS). In accordance with certain aspects, the techniques presented herein are not restricted to global systems (such as, GNSS) for SPS. For example, the techniques provided herein may be applied to or otherwise enabled for use in various regional systems, such as, Quasi-Zenith Satellite System (QZSS) over Japan, Indian Regional Navigational Satellite System (IRNSS) over India, Beidou over China, etc., and/or various augmentation systems (for example, an Satellite Based Augmentation System (SBAS)) that may be associated with or are otherwise enabled for use with one or more global and/or regional navigation satellite systems. By way of example but not limitation, an SBAS may include an augmentation system(s) that provides integrity information, differential corrections, etc., such as, Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

To compute a location estimate, a mobile device may use trilateration of power measurements. If a more accurate location estimate is desired, a mobile device may use round-trip time (RTT) measurements between the mobile device and various access points. An RTT measurement includes a round-trip travel time for signals sent between an access point and the mobile device. Unfortunately, each RTT measurement also includes a delay in the access point referred to as a turnaround calibration function (TCF). The TCF is dominated by a short interframe space (SIFS), which may be used as a fair estimate of the total TCF. The SIFS value may be: (1) known a prioir (for example, from a prior measurement); (2) assumed to follow an IEEE 802.11 standard (for example, as described below with reference to FIG. 2); (3) generalized for each group of access points; or (4) an unknown value.

To avoid estimating a separate TCF for each access point, a mobile device may group access points into a list based on a particular characteristic and then estimate a general TCF for that group of access points. For example, the mobile device may use the particular characteristic to group access points by a frequency band and/or a bandwidth of operation used in the access points. The mobile device may use the particular characteristic to group access points by a common value as defined in an IEEE 802.11 standard. The mobile device may use the particular characteristic to group access points by a chip set used in the access point. The mobile device may use the particular characteristic to group access points by manufacturers. The mobile device may use the particular characteristic to group access points by Short Interframe Space (SIPS) estimates. The mobile device may use the particular characteristic to group access points by a quality, for example, an uncertainty. The mobile device may use the particular characteristic to group access points by access point identifiers. The mobile device may use the particular characteristic to group access points by media access control addresses (MAC addresses). Generally, a mobile device uses a characteristic to group access points having a better characteristic value than an access point having a poorer characteristic value.

Outlier detection of the RTT measurements may be performed on the group to remove erroneous access points RTT measurements. Grouping of access points reduces a number of unknowns and ensures faster and more efficient TCF estimation. After a general TCF is estimated or determined for a group of access points, each RTT measurement in the group may be adjusted by the general TCF, thereby resulting in a compensated RTT value. The mobile device can then use the compensated RTT values to several assess points in the group to estimate its location.

Figure 1:
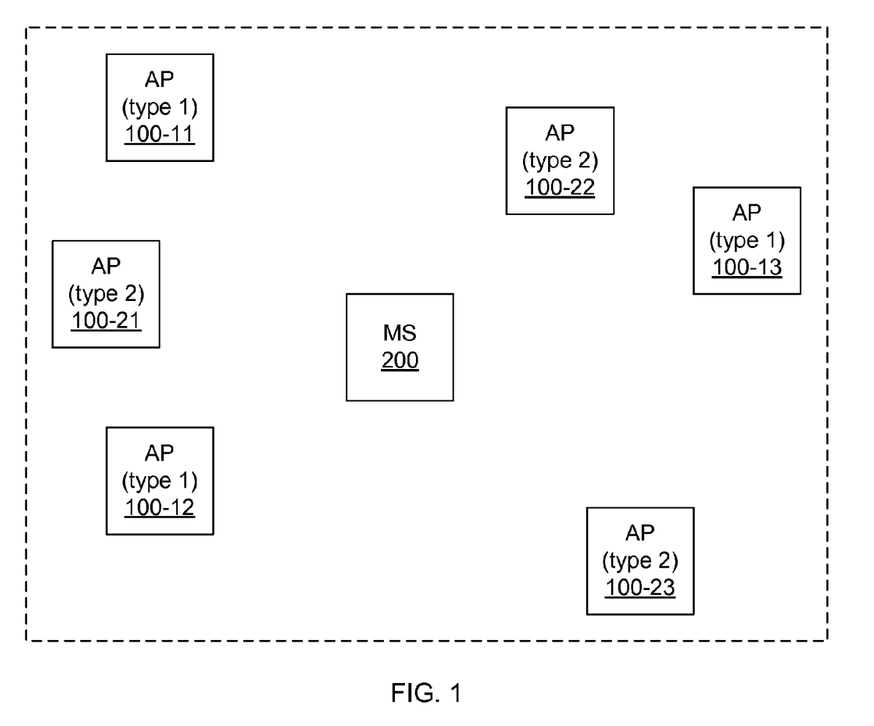
FIG. 1 maps various access points with different characteristics and a mobile device.

FIG. 1 maps various access points 100 with different characteristics and a mobile device 200. In this example, the access points 100 may be categorized into two groups: a "type 1" group and a "type 2" group. Alternatively, access points 100 may be divided into three or more types (e.g., a type-1 group, a type-2 group and a type-3 group). In this example, the access points 100 with a type-1 category include access points AP 100-11, AP 100-12 and AP 100-13 and logically group together in a first group. The access points 100 with a type-2 category are AP 100-21, AP 100-22 and AP 100-23 and grouped to a separate second group.

Traditionally, all of the access points 100 are used when determining a location estimate of the mobile device 200. A particular type of access point 100, however, may introduce an excessive amount of uncertainty. A location estimate excluding these access points 100 results in less uncertainty than a location estimate including all access points 100. Grouping access points into two categories having less uncertainty and more uncertainty, and then excluding the group of access points with more uncertainty results in a location estimate with less uncertainty. That is, a position estimate from the first group of access points (AP 100-11, AP 100-12 and AP 100-13) has less uncertainty than from all of the access points (AP 100-11, AP 100-12, AP 100-13, AP 100-21, AP 100-22 and AP 100-23).

Figure 2:
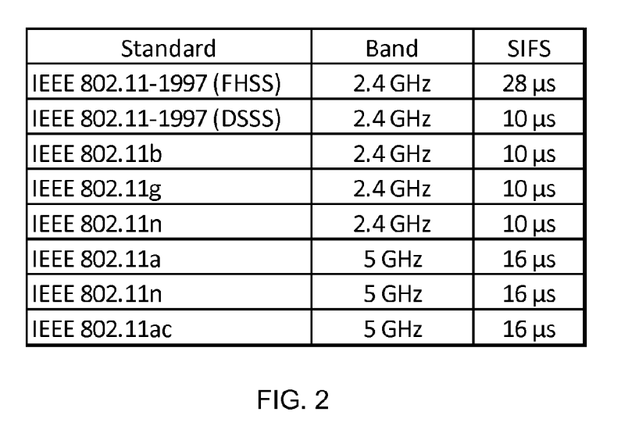
FIG. 2 illustrates an IEEE 802.11 standard assigning SIFS values to different types of access points, in accordance with some embodiments of the present invention.

FIG. 2 illustrates an IEEE 802.11 standard assigning SIFS values to different types of access points, in accordance with some embodiments of the present invention. Theoretically, an access point adhering to the IEEE 802.11-1997 standard for frequency hopping spread spectrum (FHSS) systems has a SIFS (within 10%) of 28 μs. An access point adhering to the IEEE 802.11-1997 standard for direct-sequence spread spectrum (DSSS) systems has a SIFS (within 10%) of 10 μs. An access point adhering to the IEEE 802.11b standard or IEEE 802.11g standard has a SIFS (within 10%) of 10 μs. An access point adhering to the IEEE 802.11n in the 2.4 GHz frequency band has a SIFS (within 10%) of 10 μs and in the 5 GHz frequency band has a SIFS (within 10%) of 16 μs. An access point adhering to the IEEE 802.11a standard or IEEE 802.11ac standard has a SIFS (within 10%) of 16 μs. Each of the standards is defined for the 2.4 GHz frequency band except for the IEEE 802.11a and IEEE 802.11ac standards, which are defined for the 5 GHz frequency band. The IEEE 802.11n standard is defined for both frequency bands.

Estimating a TCF for each access point separately is expensive in terms of power and bandwidth required to obtain a good standard deviation as well as longer CPU power consumption required to execute a TCF estimation algorithm. A mobile device may use a grouping of access points to more efficiently estimate a TCF. If access points follow the IEEE 802.11 standard, an acceptable RTT value may be compensated by the SIFS found in the IEEE 802.11 standard. Alternatively, approximate SIFS values may be valid for a certain category of access points. If precise SIFS values are known or SIFS values for a certain category of access points fall within a known range, the SIFS may be removed from the RTT measurements to result in compensated RTT values. These known SIFS values or categorized SIFS values may be communicated to a mobile device 200 within assistance data.

In practice though, a particular access point may not follow the SIFS restrictions set within the standard. In these cases, a location estimate using RTT measurements from these access points will increase uncertainty. When calculating a location estimate, a mobile device 100 should exclude this access point in its estimate if a more accurate estimate of the SIFS is not otherwise known.

Figure 3:
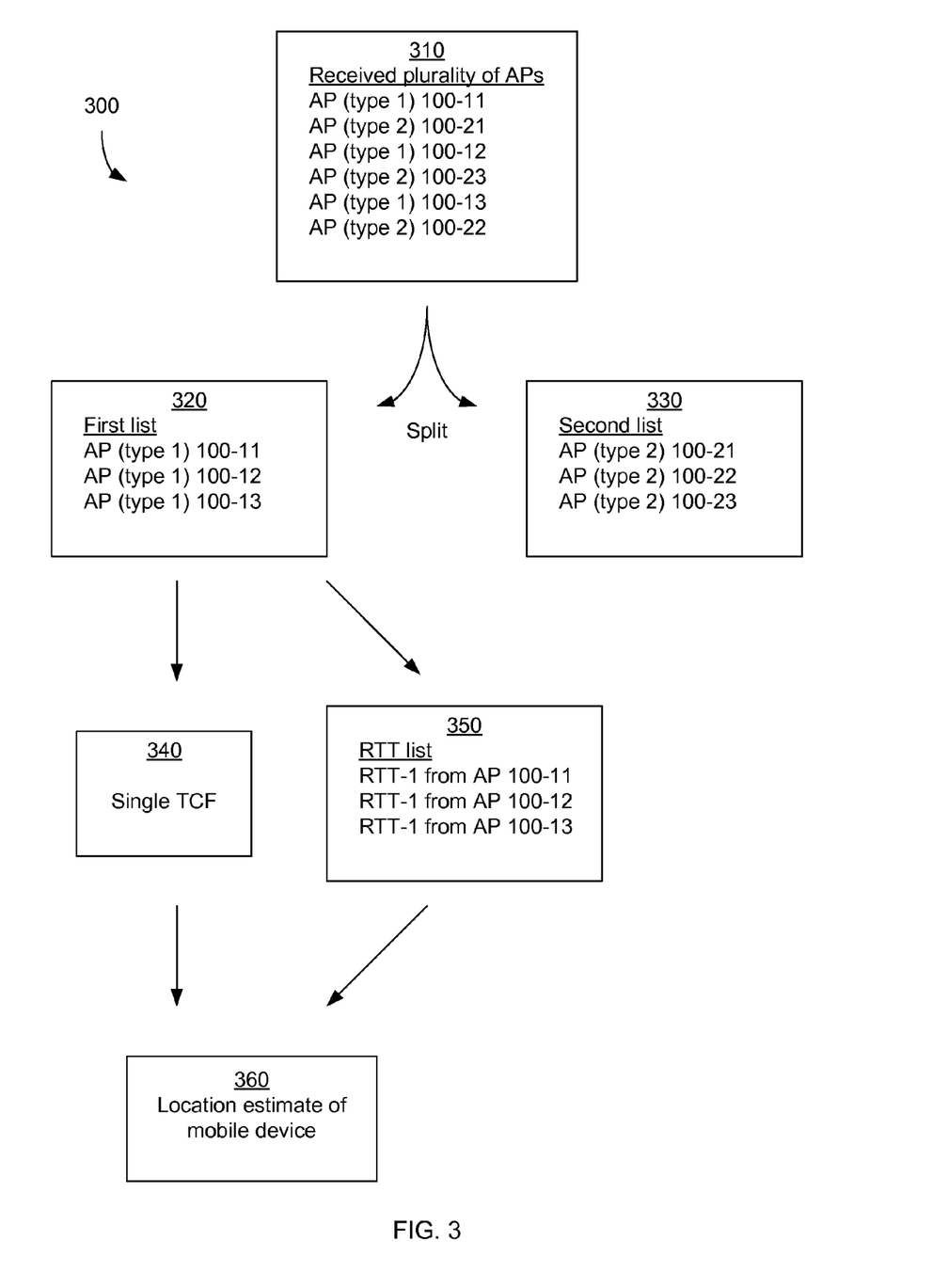
FIG. 3 shows a relationship among various data structures, in accordance with some embodiments of the present invention.

FIG. 3 shows a relationship 300 among various data structures, in accordance with some embodiments of the present invention. Structure 310 shows a listing of all received access points of any type. The listing includes both type-1 access points (AP 100-11, AP 100-12 and AP 100-13) and type-2 access points (AP 100-21, AP 100-22 and AP 100-23). Type-1 access points may generally have lower uncertainty and type-2 access points may generally have higher uncertainty. The listing may be split or subdivided into two (or more) sub-lists based on types to form separate groups.

Structure 320 includes all type-1 and only type-1 access points and structure 330 includes all type-2 and only type-2 access points. In practice, it is possible for only structure 320 to be formed and structure 330 may be the remainder of structure 310 less structure 320.

A mobile device 100 estimates a single TCF representing the first group and also measures a RTT between the mobile device and each access point listed in the first list of structure 320. The single TCF is saved as structure 340 and the RTT measurements are saved as structure 350 (shown as RTT-1 from AP 100-11, RTT-2 from AP 100-12 and RTT-3 from AP 100-13). Outlier detection may be used to remove access points of type 1 from the first list shown in structure 320. Structure 360 contains the location estimate of the mobile device 100. Next, the TCF is removed from the RTT measurements and a location estimate may be formed by trilateration of the compensated RTT value.

Figure 4:
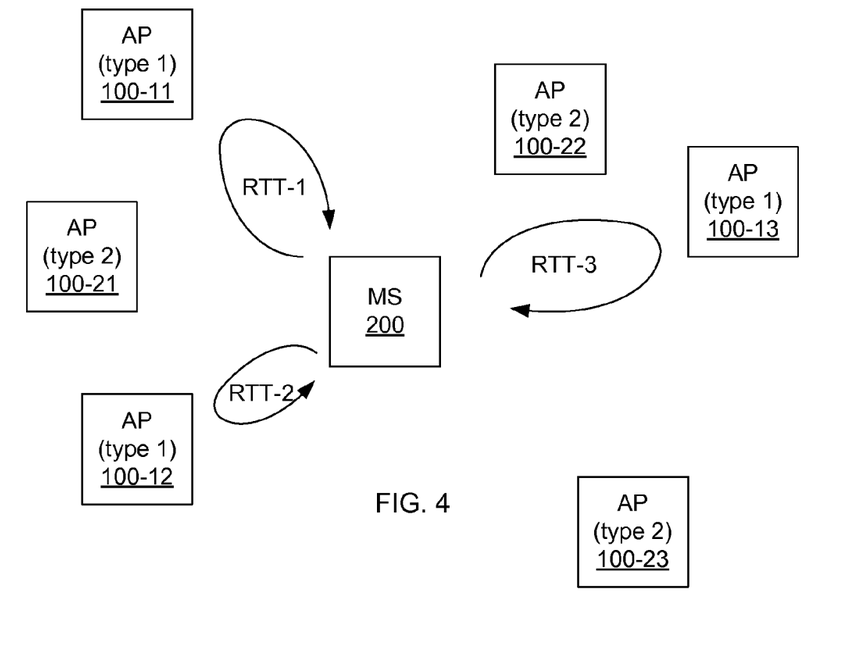
FIG. 4 shows a structure for using RTT measurements from only some access points while excluding RTT measurements from other access points to calculate a location estimate of a mobile device, in accordance with some embodiments of the present invention.

FIG. 4 shows a structure for using RTT measurements from only some access points while excluding RTT measurements from other access points to calculate a location estimate of a mobile device, in accordance with some embodiments of the present invention. As schematically illustrated in FIG. 4, since no RTT measurements are illustrated for type-2 access points in this example, which denotes that RTT measurements from type-2 access points are excluded. That is, in the example shown, even though type-2 access points are available, no RTT measurements from type-2 access points are used and only RTT measurements from type-1 access points are used to compute a location estimate.

Figure 5:
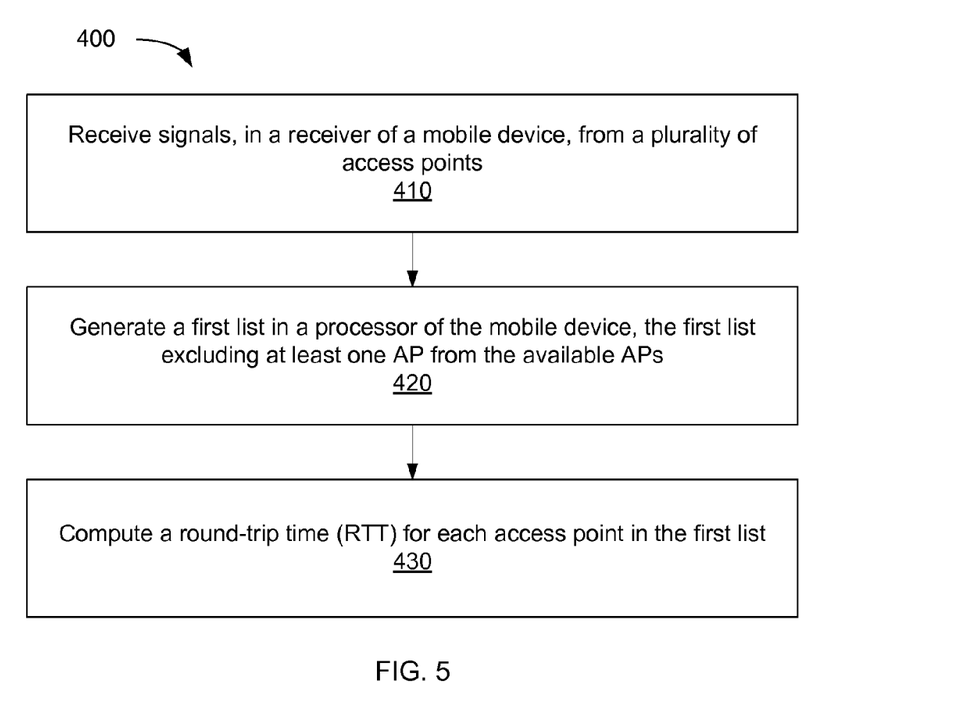
FIGS. 5 and 6 illustrate methods, in accordance with some embodiments of the present invention.
Figure 6:
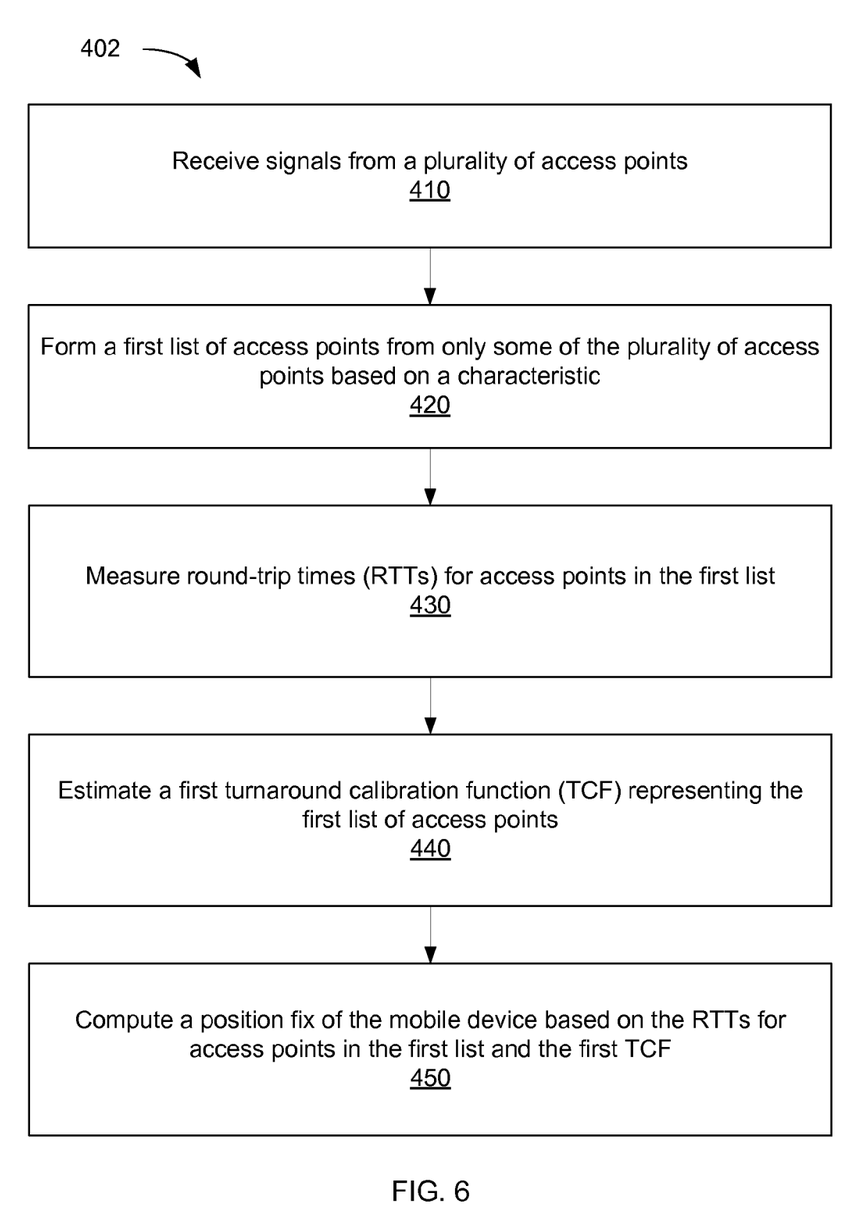

FIGS. 5 and 6 illustrate methods, in accordance with some embodiments of the present invention. In method 400 of FIG.

5 at 410, a receiver of a mobile device 200 receives signals from a plurality of access points. A processor of the mobile device 200 may place the list of available access points 100 in a list of access points (structure 310 in FIG. 3). At 420, a processor of the mobile device forms a first list of access points from only some of the plurality of access points based on a characteristic. That is, the mobile device 200 generates a first list, where the first list excluding at least one access point from the available access points. The mobile device 200 thereby forms a sub-list of some access points (for example, only type-1 access points and not type-2 access points) by splitting or filtering structure 310 into a first list (structure 320 in FIG. 3). Alternatively, structure 320 is formed directly from signals from access points having a certain characteristic (for example, a type-1 characteristic). Optionally, the mobile device 200 may also create a second list (structure 330 of FIG. 3) listing access points (for example, a type-2 characteristic) later ignored in location estimation. Therefore, in some embodiments, the first list of access points and the second list of access points are mutually exclusive.

At 430, the mobile device 200 measures round-trip times (RTTs) for access points in the first list. The RTT measurements may be sent to a server or used locally to compute a location estimate of the mobile device.

In method 402 of FIG. 6, the steps of 410-430 are described above to form a first list. Next, at 440, a processor of the mobile device 200 estimates a first turnaround calibration function (TCF) representing the first list of access points. At 450, the processor computes a position fix of the mobile device based on the RTTs for access points in the first list and the first TCF. That is, each RTT measurement for each access point in the group (the first list) is reduce by the same TCF.

In some embodiments, two groupings of access points are formed. In these embodiments, only a first list of access points (and not a second list of access points) is used to form a location estimate of a mobile device. In other embodiments, three lists of access points are formed. In these embodiments, a first list and part or all of a second list are used to form a location estimate of a mobile device. For example, when a first list contains ill-positioned access points or an insufficient number of access points to form a location estimate of a mobile device, RTT measurements from secondary access points are used to increase the pool of access points such that the pool of access points no longer is ill positioned or too small in number to form a location estimate. All of the access points, or alternatively, a selected one or selected few of the access points from the second list may be used. In still other embodiments, more than three groupings of access points are formed. For example, when a first list and a second list contain ill-positioned access points or an insufficient number of access points to form a location estimate of a mobile device, RTT measurements from a third list of access points are used. In other words, a first list is used when the first list is sufficient. A second list is used (either partially or fully) when the first list is insufficient. A third list is used when both the first and second lists are insufficient. An ill-positioned set of access points are access points that are, for example, positioned to one side of the mobile device. A well-positioned set of access points are evenly distributed around the mobile device. Three or more access points may be a sufficient number of access points, if well positioned. A set or list of access points best provide a location of a mobile device when the list includes at least three well distributed access points.

Figure 7:
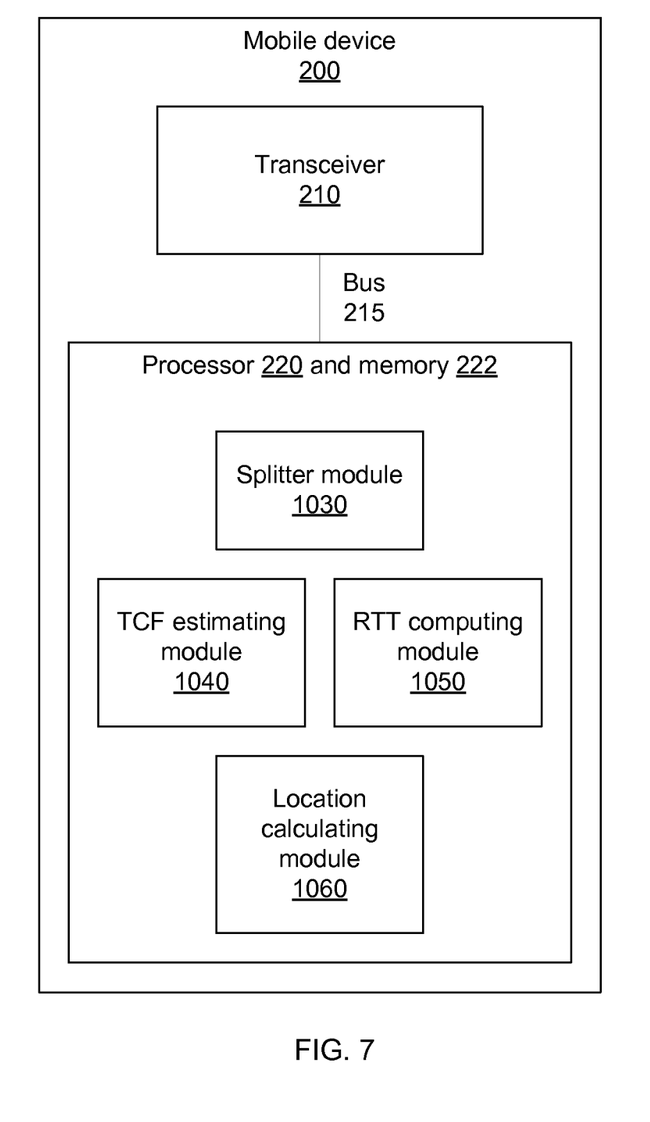
FIG. 7 illustrates a mobile device, in accordance with some embodiments of the present invention.

FIG. 7 illustrates a mobile device 200, in accordance with some embodiments of the present invention. The mobile device 200 contains a transceiver 210 and a processor 220 with memory 222. The transceiver 210 contains a wireless transmitter and a wireless receiver. The memory 222 may be integrated with and/or separate from the processor 220. In some implementations, the memory 222 stores code configured to be executed by the processor 200, the code instructing the processor 200 to perform tasks described herein. The processor 200 may execute inline code or software modules including: (1) a splitter module 1030; (2) a TCF estimating module 1040; (3) an RTT computing module 1050; and (4) a location calculation module 1060. The modules may be written as inline code or as separate routines. The splitter module 1030 forms structure 320 from either splitting structure 310 or filtering receivable access points having a certain characteristic or set of characteristics.

The TCF estimating module 1040 estimates a single TCF for a group. The TCF estimating module 1040 may estimate a TCF for only groups used to calculate a position estimate, for example, the first group but not the second group of a two group system. Alternatively, the first group and a second group but not the third group of a three group system may be used to calculate a position estimate.

The RTT computing module 1050 removes the TCF from the RTT measurements, thereby resulting in a compensated RTT value for each measurement. The location calculation module 1060 may calculate a location estimate of the mobile device 200 using only the first list in a two or more list system. Alternatively, the location calculation module 1060 may calculate a location estimate of the mobile device 200 using one or more of the list on access points of a three or more list system but excludes the last list of access points. The last list of access points often includes access points with a high degree of uncertainty in the access points' TCF values. If necessary, the last list of access points may be partially used just until the pool of access points are not ill positioned and not too few in number.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for estimating a location of the mobile device, the method comprising:
   receiving signals from a plurality of access points;
   forming a first list of access points from only some of the plurality of access points based on a characteristic;
   measuring round-trip times (RTTs) for access points in the first list;
   estimating a first turnaround calibration function (TCF) representing the first list of access points; and
   computing a position fix of the mobile device based on the RTTs for access points in the first list and the first TCF.

2. The method of claim 1, further comprising, if the first list of access points is insufficient for the position fix:
   forming a second list of access points from the plurality of access points based on the characteristic, wherein the first list of access points and the second list of access points are only some of the plurality of access points;
   measuring RTTs for access points in the second list; and
   estimating a second TCF representing the second list of access points;
   wherein computing the position fix of the mobile device based on the RTTs for access points in the first list and the first TCF comprises computing the position fix of the mobile device based on the RTTs for access points in the first list, RTTs for access points in the second list, the first TCF and the second TCF.

3. The method of claim 1, wherein the characteristic comprises different frequency bands.

4. The method of claim 1, wherein the characteristic comprises different IEEE 802.11 standards.

5. The method of claim 1, wherein the characteristic comprises different chip sets.

6. The method of claim 1, wherein the characteristic comprises different manufacturers.

7. The method of claim 1, wherein the characteristic comprises Short Interframe Space (SIFS) estimates.

8. The method of claim 1, wherein the characteristic comprises qualities.

9. The method of claim 1, wherein the characteristic comprises media access control addresses (MAC addresses).

10. The method of claim 1, wherein the characteristic comprises access point identifiers.

11. The method of claim 1, wherein computing the position fix of the mobile device based on the RTTs for access points includes computing the position fix of the mobile device based on the RTTs for access points in the first list and the first TCF while excluding some access points.

12. The method of claim 1, wherein measuring RTTs for access points in the first list comprises excluding outliers.

13. The method of claim 12, wherein the outliers are outside of a range of an IEEE 802.11 standard.

14. A mobile device for estimating a location of the mobile device, the mobile device comprising:
   a transceiver configured to receive signals from a plurality of access points;
   a processor coupled to the transceiver; and
   a memory coupled to the processor, the memory having stored thereon code configured to be executed by the processor, the code instructing the processor to:
      form a first list of access points from only some of the plurality of access points based on a characteristic;
      measure round-trip times (RTTs) for access points in the first list;
      estimate a first turnaround calibration function (TCF) representing the first list of access points; and
      compute a position fix of the mobile device based on the RTTs for access points in the first list and the first TCF.

15. The mobile device of claim 14, wherein the first list of access points is insufficient for the position fix and the code further instructing the processor to:
   form a second list of access points from the plurality of access points based on the characteristic, wherein the first list of access points and the second list of access points are only some of the plurality of access points;
   measure RTTs for access points in the second list; and
   estimate a second TCF representing the second list of access points;
   wherein the code instructing the processor to compute the position fix of the mobile device based on the RTTs for access points in the first list and the first TCF comprises code instructing the processor to compute the position fix of the mobile device based on the RTTs for access points in the first list, RTTs for access points in the second list, the first TCF and the second TCF.

16. The mobile device of claim 14, wherein the characteristic comprises at least one of:
   different frequency bands;
   different IEEE 802.11 standards;
   different chip sets;
   different manufacturers;
   counts of access points;
   Short Interframe Space (SIFS) estimates; and
   media access control addresses (MAC addresses).

17. A mobile device for estimating a location of the mobile device, the mobile device comprising:
   means for receiving signals from a plurality of access points;

means for forming a first list of access points from only some of the plurality of access points based on a characteristic;

means for measuring round-trip times (RTTs) for access points in the first list;

means for estimating a first turnaround calibration function (TCF) representing the first list of access points; and means for computing a position fix of the mobile device based on the RTTs for access points in the first list and the first TCF.

18. The method of claim 17, wherein the first list of access points is insufficient for the position fix and further comprising:

means for forming a second list of access points from the plurality of access points based on the characteristic, wherein the first list of access points and the second list of access points are only some of the plurality of access points;

means for measuring RTTs for access points in the second list; and means for estimating a second TCF representing the second list of access points;

wherein the means for computing the position fix of the mobile device based on the RTTs for access points in the first list and the first TCF comprises means for computing the position fix of the mobile device based on the RTTs for access points in the first list, RTTs for access points in the second list, the first TCF and the second TCF.

19. The mobile device of claim 17, wherein the characteristic comprises at least one of:

different frequency bands;
different IEEE 802.11 standards;
different chip sets;
different manufacturers;
counts of access points;
Short Interframe Space (SIPS) estimates; and
media access control addresses (MAC addresses).

20. A non-transient computer-readable storage medium including program code stored thereon, comprising program code for:

receiving signals from a plurality of access points;
forming a first list of access points from only some of the plurality of access points based on a characteristic;
measuring round-trip times (RTTs) for access points in the first list;
estimating a first turnaround calibration function (TCF) representing the first list of access points; and
computing a position fix of the mobile device based on the RTTs for access points in the first list and the first TCF.

21. The non-transient computer-readable storage medium of claim 20, wherein the first list of access points is insufficient for the position fix and further comprising program code for:

forming a second list of access points from the plurality of access points based on the characteristic, wherein the first list of access points and the second list of access points are only some of the plurality of access points;
measuring RTTs for access points in the second list; and
estimating a second TCF representing the second list of access points;
wherein the code for computing the position fix of the mobile device based on the RTTs for access points in the first list and the first TCF comprises code to compute the position fix of the mobile device based on the RTTs for access points in the first list, RTTs for access points in the second list, the first TCF and the second TCF.

\* \* \* \* \*